(12) United States Patent
Toskala et al.

(10) Patent No.: US 6,917,602 B2
(45) Date of Patent: Jul. 12, 2005

(54) SYSTEM AND METHOD FOR RANDOM ACCESS CHANNEL CAPTURE WITH AUTOMATIC RETRANSMISSION REQUEST

(75) Inventors: Antti Toskala, Espoo (FI); Esa Malkamaki, Espoo (FI); Mikko J. Rinne, Helsinki (FI); Anu Virtanen, Espoo (FI); Guan Hao, Beijing (CN); R. Thomas Derryberry, Plano, TX (US)

(73) Assignee: Nokia Corporation, Espoo (FI)

( * ) Notice: Subject to any disclaimer, the term of this patent is extended or adjusted under 35 U.S.C. 154(b) by 397 days.

(21) Appl. No.: 10/158,569

(22) Filed: May 29, 2002

(65) Prior Publication Data

US 2003/0223452 A1 Dec. 4, 2003

(51) Int. Cl.[7] ............................................. H04B 7/216
(52) U.S. Cl. ...................................... 370/335; 370/441
(58) Field of Search ............................... 370/335, 342, 370/441, 445, 442, 209, 320, 321, 336, 343; 375/130, 141, 144, 146, 358

(56) References Cited

U.S. PATENT DOCUMENTS 5,461,639 A * 10/1995 Wheatley, III et al. ..... 375/205
5,909,436 A    6/1999 Engstrom et al. ........... 370/343
6,301,286 B1  10/2001 Kanterakis et al. ......... 375/130
6,643,318 B1 * 11/2003 Parsa et al. .................. 375/141

OTHER PUBLICATIONS

3GPP TS 25.214 V3.8.0 (Sep. 2001) Section 6.1 (Physical Random Access Procedure).
3GPP TS 25.214 V3.8.0 (Sep. 2001) Section 6.2 (CPCH Access Procedures).

* cited by examiner

Primary Examiner—Chi Pham
Assistant Examiner—Alexander O. Boakye
(74) Attorney, Agent, or Firm—Ware, Fressola, Van Der Sluys & Adolphson LLP

(57) ABSTRACT

A system and method for random access channel (RACH) capture, where user equipment (UE) transmits a series of time-spaced access preambles each having an increasing power level to Node B and terminates access preamble transmission in response to an acquisition indicator (AI) signal returned from Node B and transmits its RACH message part. A collision detection preamble (CDP) is sent immediately after the message or embedded with the message. A collision detection indicator (CDI) signal matching the CDP is transmitted from Node B to the UE identified as having the failed RACH message requesting retransmission of the message. Optionally, the relative retransmission power level is also specified to the UE along with the CDI signal.

12 Claims, 4 Drawing Sheets

SYSTEM AND METHOD FOR RANDOM ACCESS CHANNEL CAPTURE WITH AUTOMATIC RETRANSMISSION REQUEST

TECHNICAL FIELD

The present invention relates generally to establishing a connection between two radio receiver/transmitter stations and deals with a system and method for establishing a connection between a terminal or user equipment (UE) and a network.

More particularly, the present invention relates to establishing a connection wherein automatic retransmission requests and collision resolution are carried out at a base station coupled to the network.

Specifically, the present invention relates to establishing a connection in a cellular system between a UE and the network using random access channel (RACH) capture at the receiving station (Node B) wherein the UE and Node B have means for automatic retransmission requests and collision resolution.

BACKGROUND OF THE INVENTION

Communication systems and networks, such as, for example, mobile telephone or cellular systems have greatly expanded and are in widespread use and enjoy increased popularity as the communication device of choice. One reason for such popularity is the mobility afforded users to travel from area-to-area and retain the ability to receive service and communicate with other users. These communication devices typically establish end-to-end communication through a network. In its most simplistic terms, unlike hard-wired "land" communications, mobile telecommunication devices or user equipment (UE), such as, cellular telephones must establish a connection to a serving controller coupled to a network to carry communication data. Accordingly, a procedure is carried out between the UE and network via the serving controller to establish a connection. The operation, features and advantages of cellular type communication and devices are well known.

Briefly, a description of the general connection process follows. An uplink access channel, broadly referred to herein as the random access channel (RACH), is one typically utilized by user equipment (UE) for initial access signaling to a network in instances when no dedicated or shared physical channel connection is currently established. For example, the RACH can be used for initial cell access after the UE powers-on. The RACH can be used to perform a location update after the UE moves from one location to another or for initiating a call or for user data transmission. The RACH capture procedure specified by the $3^{rd}$ Generation Partnership Project (3GPP) requires the UE to transmit a series of access preambles each with increasing transmit power for each access preamble attempt. Each of the access attempts is separated by an appropriate waiting time of sufficient duration to allow detection of an acknowledgment indication (AI) signal from the receiving station Node B.

Once the AI signal is received, the UE may transmit the message on the RACH and the random access procedure terminates. If the reception of the RACH message fails, the random access procedure is restarted after the expiration of a timer at the higher layers (MAC) of the UE. The protocol of the higher layers contains an automatic retransmission request (ARQ) functionality, which is provided by the radio link controller (RLC) protocol. The RLC protocol entity in the network is terminated in the serving radio network controller (SRNC); however, no mechanism exists for requesting retransmissions of the RACH messages from the receiving or base station (Node B). In the event of a failed RACH capture, the UE is required to repeat the RACH procedure after waiting for a time-out whose duration must be set as long as the round-trip delay to the SRNC and back in order to avoid duplicate transmissions in the case of a successful RACH capture. One drawback of the current RACH procedure is the duration of the time-out period before the UE receives a retransmission request when the reception or decoding of the RACH message fails. A further drawback is that the automatic retransmission request is returned from the higher network entity (SRNC) rather than node B.

It would be desirable therefore to speed the uplink random access channel (RACH) capture by returning an automatic retransmission request from the receiving station Node B rather than a higher network entity.

SUMMARY OF THE INVENTION

The present invention provides a system and related method for establishing a connection between a transmitting user equipment (UE) and a receiving station Node B using random access channel (RACH) capture. The invention further provides that automatic retransmission requests and collision dispute resolution occur at the receiving station Node B rather than at the higher network entity serving radio network controller (SRNC).

In a first aspect of the invention, a method for random access channel (RACH) capture to establish a connection between transmitting user equipment (UE) and a receiving station (Node B) includes the steps of transmitting a plurality of successively increasing power level time-spaced access preambles; generating an acquisition indicator (AI) signal at Node B in response to receipt of one of the plurality of time-spaced access preambles; returning the AI signal generated at Node B to the user equipment (UE); terminating transmission at the UE of the plurality of time-spaced access preambles in response to receiving the AI signal from Node B; embedding a collision detection preamble (CDP) with the RACH message; transmitting the CDP embedded RACH message after receiving the AI signal; generating a collision detection indication (CDI) signal matching the CDP of a UE whose RACH message is not correctly decoded at the receiving Node B; and requesting the UE to retransmit the RACH message in response to receiving the CDI signal generated at the receiving Node B when decoding of the RACH message at the receiving Node B has failed.

Preferably, the method includes the step of generating the CDI signal at the receiving Node B.

Preferably, the method includes the step of retransmitting the RACH message in response to the request for retransmission.

Preferably, the method includes the step of requesting retransmission of the RACH message at an estimated relative power level.

Preferably, the method includes the step of embedding the estimated power level in the CDI signal.

Preferably, the step of encoding the CDI/CDP signals includes coding using an orthogonal code set defining the estimated power level.

Preferably, the method includes the step of embedding the estimated relative power level setting in the chip area reserved for common packet channel status indicator channel (CSICH).

In a second aspect of the invention, a system for establishing a connection using random access channel (RACH) capture has at least one transmitting user equipment (UE) having means for transmitting a plurality of successively increasing power level time-spaced preambles and at least one receiving Node B station having means for receiving one of the time-spaced preambles and means for returning an acquisition indicator (AI) signal in response thereto.

The UE further includes means responsive to the AI signal to terminate transmission of the time-spaced preambles, and means for generating a collision detection preamble (CDP) embedded in an RACH message for transmission to the receiving Node B subsequent to receiving the AI signal.

The receiving Node B station further includes means for decoding the RACH message and for generating a collision detection indication (CDI) signal matching the CDP of a UE whose RACH message is incorrectly decoded at the receiving Node B station. The receiving Node B station also includes means for returning the CDI signal to the UE to request retransmission of the RACH message that was incorrectly decoded at the receiving Node B station.

In a third aspect of the invention, user equipment (UE) for establishing a connection with a NODE B station using random access channel (RACH) capture includes means for transmitting a plurality of successively increasing power level time-spaced preambles and means responsive to an acquisition indicator (AI) signal generated at a receiving NODE B station for terminating transmission of the time-spaced preambles. The UE also includes means for generating a collision detection preamble (CDP) embedded in a RACH message for transmission to the receiving NODE B station.

Preferably, the UE includes means for re-transmitting the RACH message in response to a collision detection indication (CDI) signal matching its CDP signal when its RACH message is incorrectly decoded at the receiving NODE B station.

Preferably, the UE further includes means for decoding a power transmit level signal embedded in the CDI signal for re-transmitting the RACH signal at the decoded power transmit level.

In a fourth aspect of the invention, a NODE B station for establishing a connection with user equipment (UE) using random access (RACH) capture includes means for receiving a time-spaced preamble from a UE and means for returning an acquisition indicator (AI) signal to a UE in response to receiving said time-spaced preamble. The NODE B station also includes means for decoding a RACH message received from a UE and means for generating a CDI signal corresponding to the CDP of a UE whose RACH message is incorrectly decoded and means for returning the CDI signal to the UE to request re-transmission of the RACH message from the UE.

Preferably, the NODE B station further includes means for embedding a power level re-transmit signal in the CDI signal.

BRIEF DESCRIPTION OF THE DRAWINGS

Other objects, features and benefits of the present invention will become readily apparent from the following written description and drawings wherein.

DETAILED DESCRIPTION OF PREFERRED EMBODIMENTS

Figure 1:
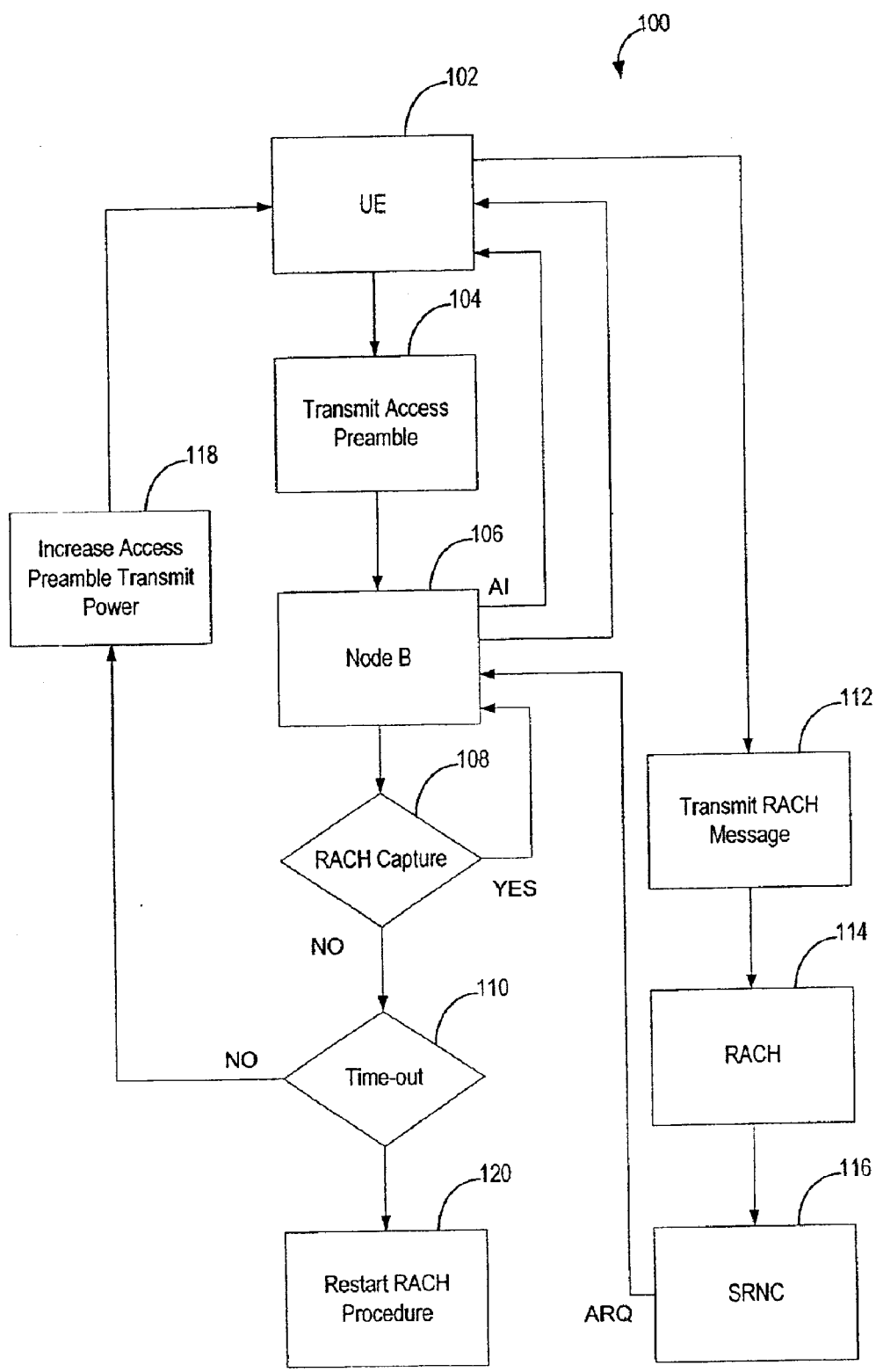
FIG. 1 is a flow chart showing the current 3GPP release 99 RACH capture procedure.

Turning now to the drawings and considering the invention in further detail, a flow chart showing the current 3GPP release 99 RACH capture procedure is illustrated in FIG. 1 and is generally designated 100. The random access procedure is a process that is used by the user equipment (UE) 102 to request a dedicated channel (DCH) allocation or to send small amounts of data to the network. The RACH transmissions are controlled by the MAC layer, which receives RACH transmission control parameters from the radio resource control (RRC). The RACH control parameters include a set of access service classes (ASC), a maximum number of preamble ramping cycles and the range of the back-off interval for the timer, which is applicable when a negative acknowledgment (NAK) on the acquisition indicator channel (AICH) is received.

When data is to be transmitted, the MAC selects the ASC to be used from the available set of ASCs and includes an identifier of a certain physical random access channel (PRACH) partition and an associated persistence value $P_i$. A physical access request is transmitted from the MAC to layer one and is represented as the transmit access preamble function block 104 in FIG. 1. The purpose of the procedure is to ensure that the random access attempts of individual UEs do not happen at the same time but are as evenly spread in the time domain as possible. Layer one repeatedly sends the RACH access preambles at the same time to Node B, represented in function block 106. A test to determine if the RACH capture has occurred is carried out in step 108, and if RACH access has not occurred, a test is made in function block 110 to determine whether the time for capture interval has expired. If the time interval has not expired, the system moves to function block 118 and increases the access preamble transmit power in accordance with a predetermined amount or a requested amount. The access preamble is again transmitted from the function block 104 in the UE at the increased power level to Node B and the cycle is repeated.

The number of preambles that are transmitted at increasing power levels is determined from the RACH transmission control parameter sent from the RRC. If it is determined in the determination step 108 that RACH is captured, an acquisition indication (AI) signal received at the UE causes the UE to stop sending access preambles and instructs the UE to transmit the RACH message as indicated by the function block 112. If in the time-out test 110 it is determined that the AI signal is not returned to the UE, the UE restarts the RACH procedure after a predetermined time as indicated in function block 120. The RACH message is transmitted via the RACH channel 114 to the serving radio network controller (SRNC) shown by function block 116. If the RACH message is not received at the SRNC 116, a request for retransmission (ARQ) can be returned to the UE, if the radio link control protocol of the transport channel through which the message is transported is operating in acknowledged mode, causing L2 in the UE to re-start the RACH procedure. Alternatively, if an appropriate L3 response message is not received in the UE during a timeout configured by the network, the RRC protocol will request to re-transmit the message. The physical random access procedure represented in the flow chart of FIG. 1 is well understood by those skilled in the art and is described in further detail in 3GPP TS 25.214 v3.8.0 (2001–009), section 6.1, which is incorporated herein by reference and to which the reader may refer for additional information.

Figure 2:
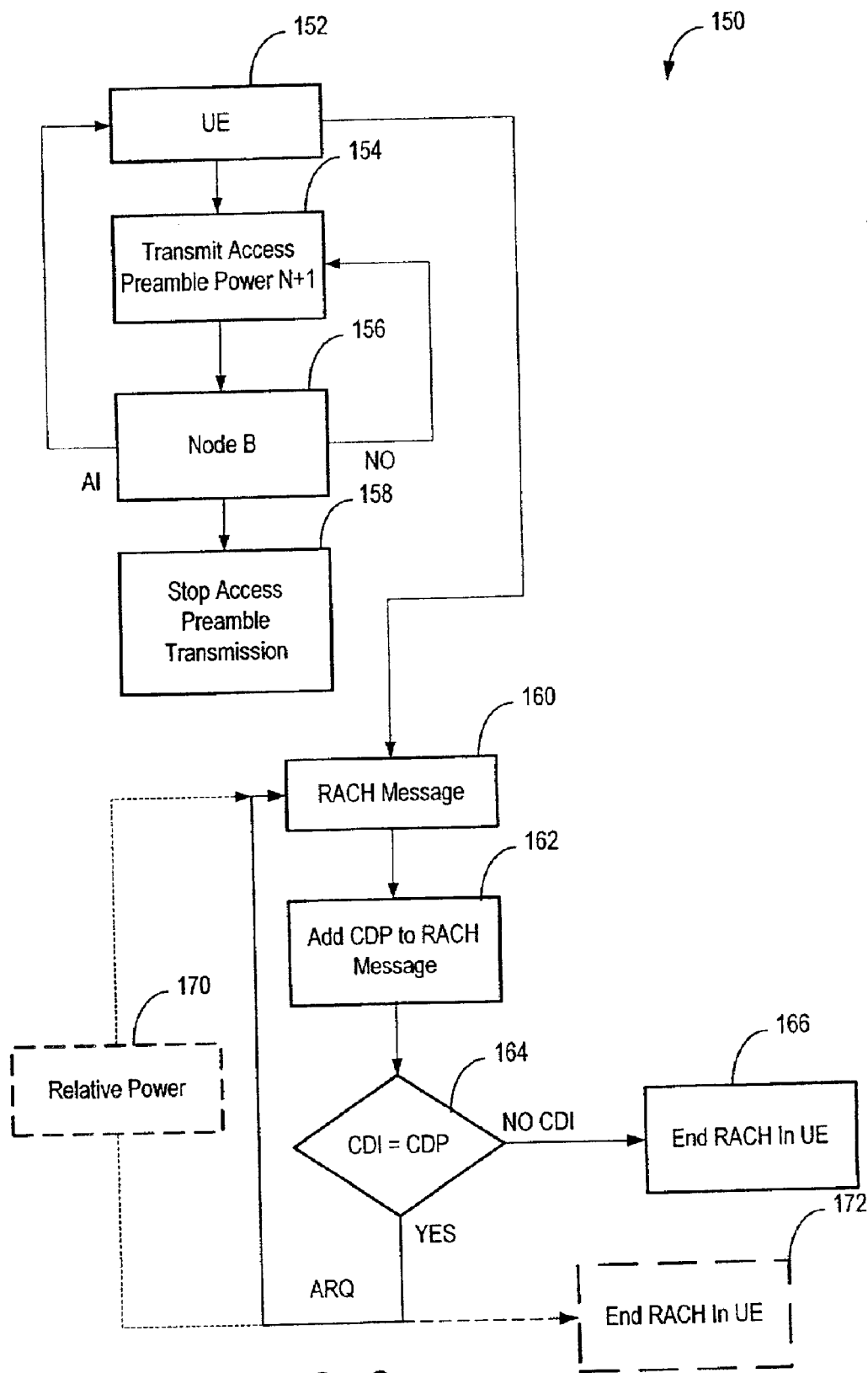
FIG. 2 is a flow chart showing the enhanced uplink RACH capture procedure embodying the present invention.

Turning now to the flow chart shown in FIG. 2, the enhanced uplink RACH capture procedure embodying the present invention is illustrated therein for purposes of describing the invention and is generally designated 150. The RACH capture procedure starts with the UE 152 transmitting a series of time-spaced access preambles of increasing transmit power on each of the subsequent transmitted preambles as represented by the function block 154. The access preambles are transmitted to Node B, represented by the function block 156. Upon receipt of an access preamble of sufficient power, an AI signal is returned to the UE 152 causing it to stop transmitting the access preambles as indicated in block 158. Receipt of the AI signal at the UE initiates transmission of the RACH message as indicated by the function block 160.

A collision detection preamble (CDP), preferably random, is either added to the end of the RACH message or can be transmitted after the message as shown in block 162. The RACH message is tested for successful transmission in the Node B by checking the cyclic redundancy check (CRC) error detection code in the message. If the RACH message has been correctly captured and no collision detection indicator (CDI) is transmitted by Node B to this UE, the RACH transmission procedure ends in the UE as shown in block 166. If in block 164 it is detected that several RACH messages were transmitted in the same RACH slot, or the message coding is otherwise unsuccessful, a CDI matching the CDP of one of the UEs transmitting in the same RACH slot is returned by the Node B requesting retransmission of the RACH message in a different time slot, thus resolving the collision condition.

Preferably, the CDI can also include information specifying the estimated relative power, as illustrated in the dashed-line function block 170, for the RACH message retransmission. Optionally, in the event of a collision detection, the RACH procedure in the UE can terminate as indicated by the dashed-line function block 172. It should also be noted that the detection of a collision can result in optionally providing for additional retransmissions of the RACH message with either the number of retransmissions specified or a time interval within which the retransmissions occur, dependent upon the exact specification determined. It should be further noted that the retransmitted RACH message can be combined in the receiving Node B with a previous RACH message transmission using Type-II or Type-III hybrid ARQ methods well known to those skilled in the art, again dependent upon the specification followed.

Figure 3:
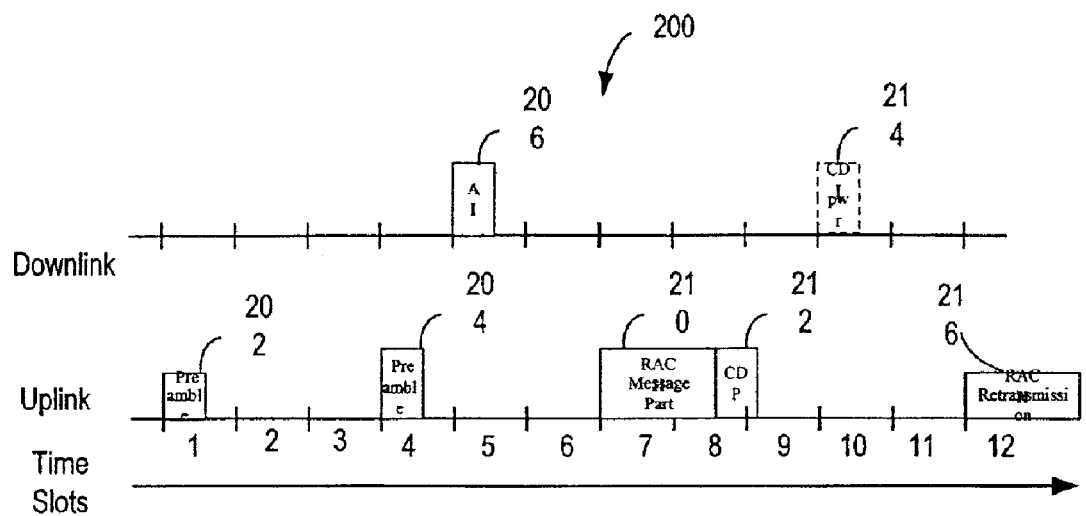
FIG. 3 is a timing diagram showing the sequence of the RACH capture procedure embodying the present invention.

Turning now to FIG. 3, a timing diagram is illustrated therein showing the sequence of the RACH capture procedure embodying the present invention. As illustrated in FIG. 3, a series of time-spaced access preambles 202, 204 are transmitted in the uplink direction to Node B in timeslots 1 and 4, respectively. The power of the access preamble 204 is higher than the power of the previously sent access preamble 202. Upon receipt of an access preamble at Node B, an acquisition indicator (AI) signal 206 is returned on the downlink to the UE causing the UE to terminate transmission of access preambles. Upon receipt of the AI 206, the UE transmits the RACH message 210 on the uplink to Node B. A collision detection preamble (CDP) 212 is transmitted after the RACH message portion 210 to Node B. The CDP 212 may be embedded as part of the RACH message part or may follow as a random collision detection preamble. In any event, the CDP is transmitted as part of or immediately after every RACH message.

If the RACH message part is successful, i.e., the RACH message is decoded correctly, no collision detection indicator (CDI) is transmitted from Node B to the UE. If the decoding of the RACH message fails or is incorrect for any reason, a CDI signal is returned on the downlink from Node B to the UE to request retransmission of the RACH message part. The UE requiring the retransmission of the RACH message part is identified by the CDI signal 214 as a result of its match with the CDP 212 of the "failed" message. In response to the CDI signal returned from Node B, the UE retransmits the RACH message 216 on the uplink to Node B. The CDI signal 214 may also include information specifying the estimated power level that the UE should use in the RACH message retransmission. The estimated power level coding is preferably embedded in the CDI signal.

The retransmitted RACH message can also include the CDP. Further retransmissions, if needed, can be requested in the same way using the CDI.

One method for encoding the CDP/CDI signal and the power level setting for retransmission can be implemented in a manner somewhat analogous to that currently specified for similar (but not the same) functionality on the Common Packet Channel (CPCH) in 3GPP specification 25.211 which disclosure is incorporated herein by reference. The method is broadly explained herein in the examples which follow below. The actual coding and implementation is not crucial to the invention but is merely provided for a fuller appreciation of the invention.

In a first example, the encoding of CDP/CDI signal and the power level setting for retransmission can be encoded using a new orthogonal code set rather than the code set used in AICH.

In a second example, an orthogonal code set such as that used in AICH can be used together with a new definition of the meaning of AI.

The specific coding implementation used to encode the CDP/CDI signal is beyond the scope of the present invention disclosure. The important part of the invention disclosed herein is the use of the CDP/CDI signal in the establishment of the connection between two radio receiver/transmitter stations, such as a UE and Node B.

Figure 4:
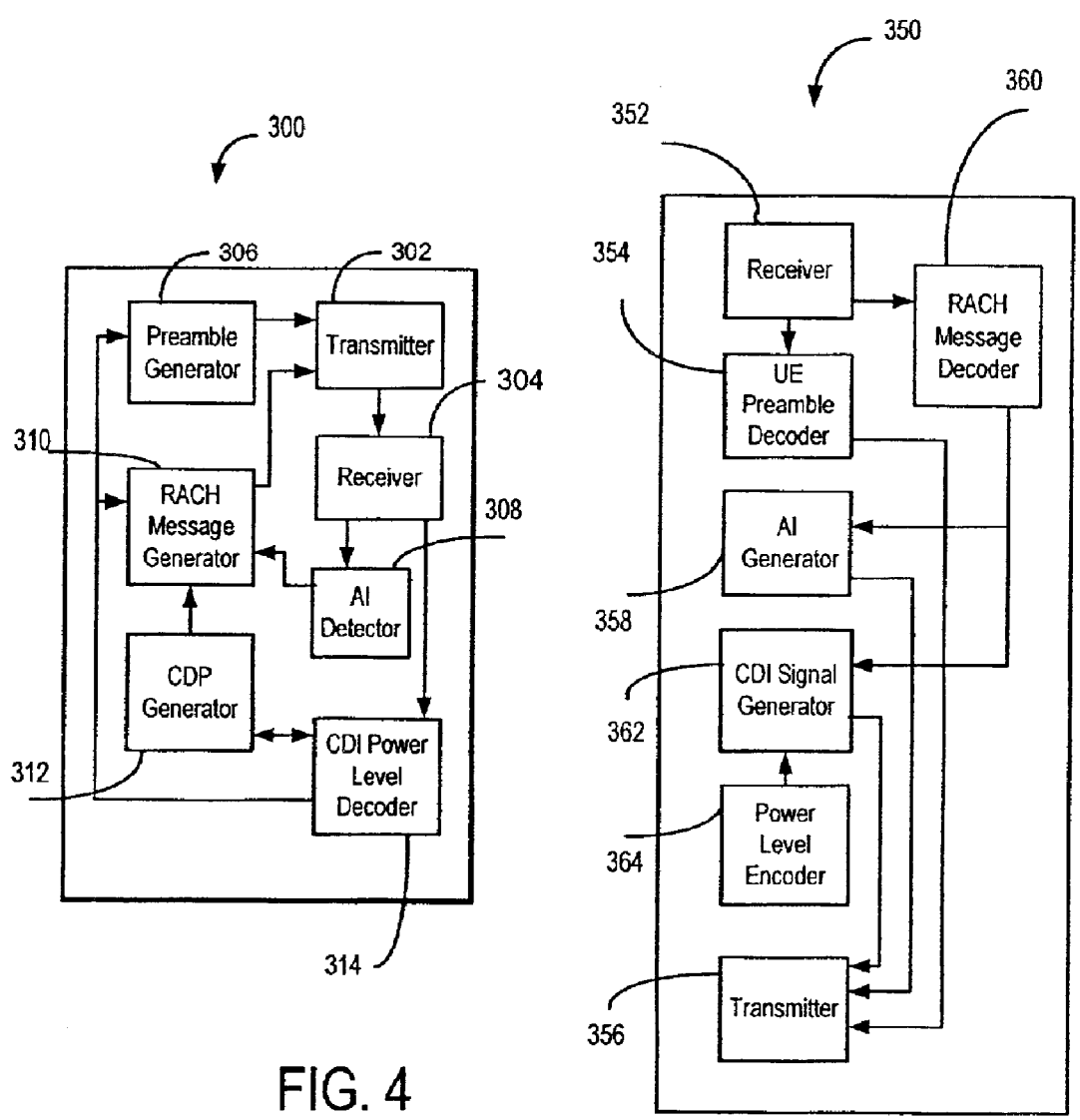
FIG. 4 is a schematic functional block diagram of the major functional components of user equipment (UE) and receiving Node B station embodying the present invention.

Turning now to FIG. 4, a schematic functional block diagram of the major functional components of user equipment (UE), generally designated 300, and a receiving Node B station, generally designated 350, for carrying out the invention is illustrated therein. The UE 300 includes a transmitter 302 and receiver 304. A preamble generator 306 produces the successively increasing power time-spaced access preambles which are transmitted to the receiving Node B station 350. Upon receipt of an acknowledge indicator (AI) signal by the AI detector 308, the RACH message generator 310 provides the RACH message for transmission to the Node B station 350. A collision detection preamble (CDP) generator 312 provides the CDP signal as an embedded part of the RACH message or immediately following the code for the RACH message for transmission by the transmitter 302 on the uplink to the Node B station 350. A receiver 352 at the Node B station 350 receives the transmitted access preambles and RACH message on the uplink from the UE 300. A UE preamble decoder 354 decodes the transmitted preambles to determine the identity of the UE transmission. Upon successful decoding, the transmitter 356 transmits an AI signal from the AI generator 358 on the downlink to the UE 300. The UE 300 now transmits the RACH message with the embedded collision detection preamble. The RACH message is received at the Node B station 350 and is decoded by the RACH decoder 360. If for some reason the decoding of the RACH message fails, the CDI generator 362 generates a CDI signal which matches the collision detection preamble code the UE 300, whose RACH message is incorrectly decoded. The CDI signal together with an embedded power level request for retransmission generated by the power level encoder 364 is transmitted on the downlink to the UE 300. The CDI power level decoder 314 in the UE determines the estimated power level for retransmission of the RACH message and supplies this information to the RACH message generator and transmitter. The RACH message is then retransmitted at the increased power level to repeat the connection establishment attempt using a different time slot.

Figure 5:
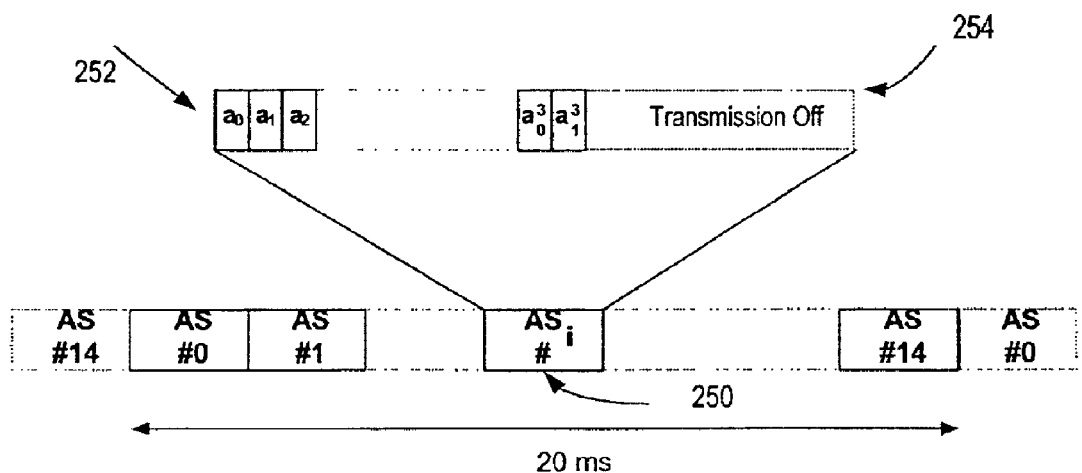
FIG. 5 is a timing diagram showing an alternative embodiment for embedding the estimated relative power retransmission request in the RACH message.

An alternate embodiment for embedding the estimated relative power retransmission request in the RACH message is shown in the timing diagram in FIG. 5. In this embodiment, the power setting is encoded and placed in the message area reserved for the common packet channel status indicator channel (CSICH). As illustrated in FIG. 5, the data packet AS#I and generally designated 250, is comprised of an API part $A_0$ to $A_{31}$, generally designated 252, comprising 4,096 chips corresponding to 32 real value symbols. The block also contains 1,024 chips in the area reserved for CSICH, generally designated 254. The 1,024 chips available for coding provide relatively easy defining of the power levels to be used in the retransmission. Again, the specifics of the power encoding are not part of the present disclosure, and it should be understood that the present invention is intended to use the power level information in whatever form it is encoded. Therefore, the embodiment considered in FIG. 5 is presented as a further illustrative example of the present invention.

A system and method for use in the establishment of a connection between two radio receiver/transmitter stations, specifically for random access channel capture (RACH) at the receiving Node B, with automatic retransmission request and collision dispute resolution have been presented above in several preferred embodiments. It will be recognized by those skilled in the art that the present invention is not restricted to a "random access channel" but is applicable to any two transmitter/receiver networks and in systems which are not cellular in the traditionally accepted definition of a cellular architecture. Additionally, it will be recognized by those skilled in the art that various modifications and changes may be made, for example, the encoding of the power level for retransmission and encoding of the collision detection indicator other than that described above, without departing from the spirit and scope of the present invention. Therefore, the invention is presented by way of illustration rather than limitation.

What is claimed is:

1. Method for establishing a connection between a receiving NODE B station and a transmitting User Equipment (UE) station using random access channel (RACH) capture comprising the steps of:

transmitting a plurality of successively increasing power level time-spaced access preambles;

generating an acquisition indication (AI) signal at node B in response to receipt of one of said plurality of time-spaced access preambles;

returning said AI signal generated at node B to the user equipment (UE);

terminating transmission at the UE of said plurality of time-spaced access preambles in response to said NODE B returned AI signal;

embedding a collision detection preamble (CDP) with the RACH message;

transmitting said CDP embedded RACH message after receiving said AI signal;

generating a collision detection indication (CDI) signal matching the CDP of a UE, whose RACH message was not correctly decoded at the receiving node B, and requesting retransmission of the RACH message in response to receiving at the UE said CDI signal generated at the receiving node B when decoding of the RACH message at node B has failed.

2. The method as defined in claim 1 further comprising the step of generating the CDI signal at the receiving Node B.

3. The method as defined in claim 1 further comprising the step of re-transmitting the RACH message.

4. The method as defined in claim 1 further comprising the step of requesting retransmission of the RACH message at an estimated relative power level.

5. The method as defined in claim 3 further comprising the step of embedding the estimated power level in the CDI signal.

6. The method as defined in claim 4 further comprising the step of encoding the CDI/CDP signals by using an orthogonal code set defining the estimated relative power level.

7. The method as defined in claim 4 further comprising embedding the power setting in the chip area reserved for common packet channel status indicator channel (CSICH).

8. A system for establishing a connection using random access channel (RACH) capture comprising:

at least one transmitting user equipment (UE) having means for transmitting a plurality of successively increasing power level time-spaced preambles;

at least one receiving Node B station having means for receiving one of said time-spaced preambles and means for returning an acquisition indicator signal (AI) in response thereto;

said UE further comprising means responsive to said AI signal to terminate transmission of said time-spaced preambles, and means for generating a collision detection preamble (CDP) embedded in a RACH message for transmission to said receiving Node B subsequent to receiving said AI signal;

said receiving Node B station further comprising means for decoding said RACH message and for generating a collision detection indication (CDI) signal matching the CDP of a UE whose RACH message is incorrectly decoded at the receiving Node B and means for returning said CDI signal to the UE to request retransmission of the RACH message that was incorrectly decoded at the receiving Node B.

9. User equipment (UE) for establishing a connection with a NODE B station using random access channel (RACH) capture comprising:

means for transmitting a plurality of successively increasing power level time-spaced preambles;

means responsive to an acquisition indicator (AI) signal generated at a receiving NODE B station for terminating transmission of said time-spaced preambles;

means for generating a collision detection preamble (CDP) embedded in a RACH message for transmission to the receiving NODE B station; and means for re-transmitting the RACH message in response to a collision detection indication (CDI) signal matching the CDP signal of the UE whose RACH message is incorrectly decoded at the receiving NODE B station.

10. The UE as defined in claim 9 further comprising means for decoding a power transmit level signal embedded in the CDI signal for re-transmitting the RACH signal at the decoded power transmit level.

11. A NODE B station for establishing a connection with user equipment (UE) using random access (RACH) capture comprising:

means for receiving a time-spaced preamble from a UE;

means for returning an acquisition indicator (AI) signal to a UE in response to receiving said time-spaced preamble;

means for decoding a RACH message received from a UE;

means for generating a CDI signal corresponding to the CDP of a UE whose RACH message is incorrectly decoded; and means for returning the CDI signal to the UE to request re-transmission of the RACH message from the UE.

12. The NODE B station as defined in claim 11 further including means for embedding a power level re-transmit signal in the CDI signal.

* * * * *